Sept. 10, 1968    F. F. W. KROHN    3,400,444
METHOD OF MAKING REINFORCED PANELS OF HIGH TEMPERATURE MATERIAL
Filed Dec. 8, 1964    3 Sheets-Sheet 1

FRITZ F.W. KROHN
*INVENTOR.*

BY Earl F. Kotts
ATTORNEY
Carl R. Brown
attorney

Sept. 10, 1968　　　　F. F. W. KROHN　　　　3,400,444
METHOD OF MAKING REINFORCED PANELS OF HIGH TEMPERATURE MATERIAL
Filed Dec. 8, 1964　　　　　　　　　　　3 Sheets-Sheet 2

FRITZ F. W. KROHN
INVENTOR.

BY Earl F. Kotta
ATTORNEY
Earl R. Brown
attorney

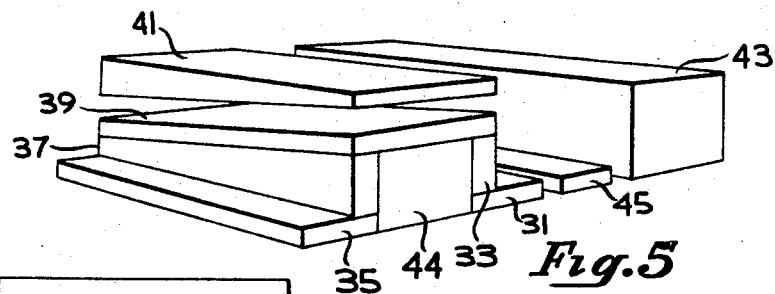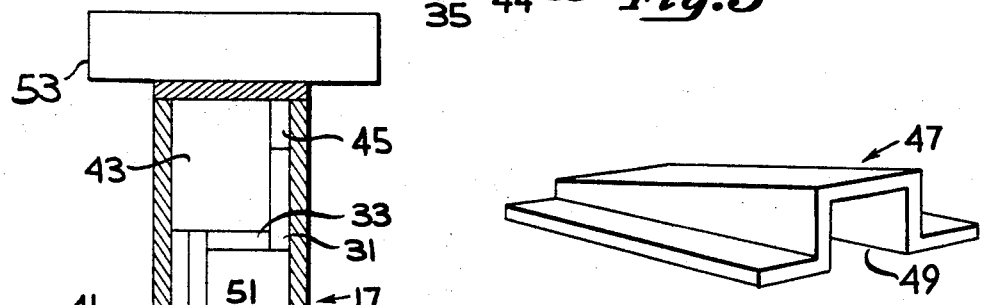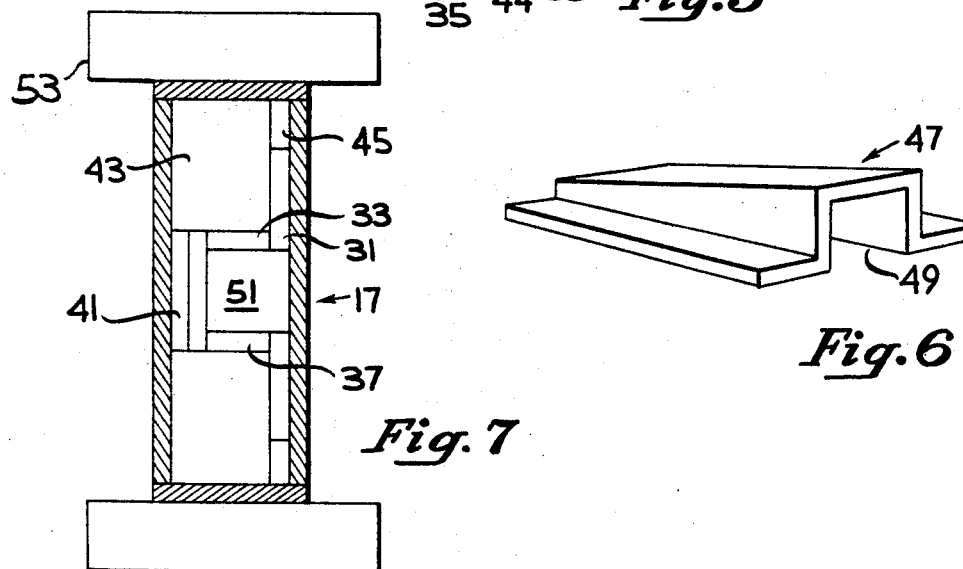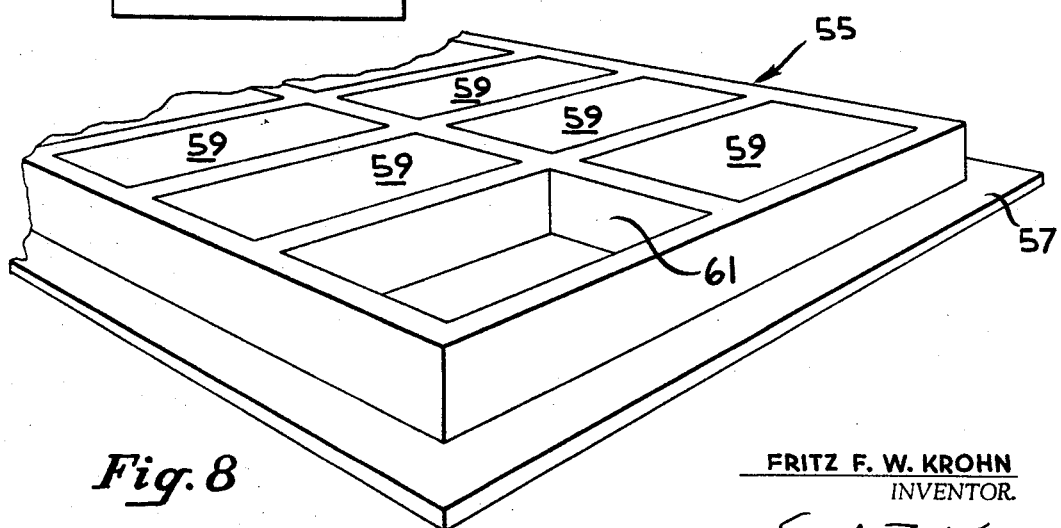
FRITZ F. W. KROHN
INVENTOR.

United States Patent Office 3,400,444
Patented Sept. 10, 1968

3,400,444
METHOD OF MAKING REINFORCED PANELS
OF HIGH TEMPERATURE MATERIAL
Fritz F. W. Krohn, Del Mar, Calif., assignor to General
Dynamics Corporation, San Diego, Calif., a corporation of Delaware
Filed Dec. 8, 1964, Ser. No. 416,743
4 Claims. (Cl. 29—423)

ABSTRACT OF THE DISCLOSURE

The present invention relates to a method of producing joined structural members by placing such members in abutting positions with spacer elements maintaining the members' relative position to form a substantially boxlike configuration, enclosing the abutting members and spacing members in an evacuated deformable metal enclosure, evacuating the enclosure and hot rolling the entire package, and then separating the joined members from the elements by mechanical means giving a composite joined structure.

---

Materials such as titanium and beryllium are extremely difficult to extrude or forge into desired shapes because one of their most important characteristics is resistance to distortion at high temperature. They are also difficult to machine and weld.

It is an object of the present invention to provide an improved method for producing structural members of high strength, high temperature material, which method is relatively simple and economical to practice.

It is another object of the present invention to provide a method for producing open face structural members of high strength, high temperature material, the resulting structural members being accurately formed and strong.

In the drawings:

FIGURE 5 is a perspective exploded view of a portion of an assembly for producing a structural member of different configuration, said assembly being adapted for positioning in an envelope and processing such as shown in FIGURES 2–4.

FIGURE 6 is a perspective view of the resulting structural member after the assembly of FIGURE 5 has been subjected to the process steps of FIGURES 2–4.

FIGURE 7 is an elevation, partly in section, of an assembly adapted to be rolled and joined in two different planes.

FIGURE 8 is a fragmentary perspective view of an open-face waffle pattern assembly which can be used in the process of the present invention.

Figure 1:
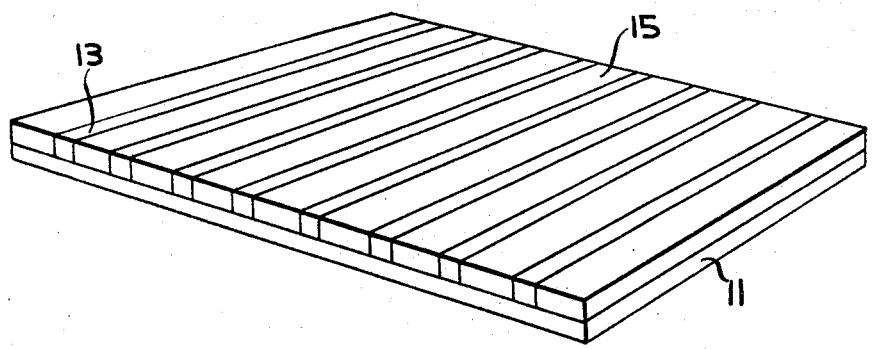
FIGURE 1 is a perspective view of a flat sheet of work material with reinforcing ribs of work material placed thereon, the reinforcing ribs being spaced apart by spacing blocks of low cost, low strength material.

FIGURE 1 shows a flat sheet 11 of a high strength, high temperature material such as titanium, for example. A plurality of titanium bars 13 are positioned at intervals along the sheet 11. These bars are separated by spacer blocks 15 of a different low cost material such as steel. The blocks must be deformable under high temperatures. A parting agent is applied on the blocks 15 to make certain that the blocks are not bonded to the sheet 11 and bars 13 during the ensuing process steps. The parting agent should not contain organic matter or any material which will emanate free oxygen. Molybdenum disulfate is an example of such a parting agent. A tightly packed rectangular assembly is thus formed.

The assembly, comprising the flat sheet 11, the bars 13, and the blocks 15, is positioned inside a suitable container or envelope 17. In this example the envelope is formed of steel panels welded together at the seams to provide a closed container. The air is withdrawn from the container through a hollow stem 19 by the pump 21. The stem 19 is then sealed, and the structural member assembly is contained in a vacuum inside envelope 17. The vacuum avoids re-oxidation of the workpiece during the high temperature joining operation.

Next the envelope with the structural member assembly inside is heated by a suitable heating means 23 to a selected rolling temperature and rolled along an axis parallel to the bars 13 in the rolling mill 25. The pressure of the rolling mill 25 ruptures in stretching any oxide coating on the surfaces of the titanium elements, and the bare interface between the bars 13 and sheet 11 is fusion bonded under pressure.

Figure 4:
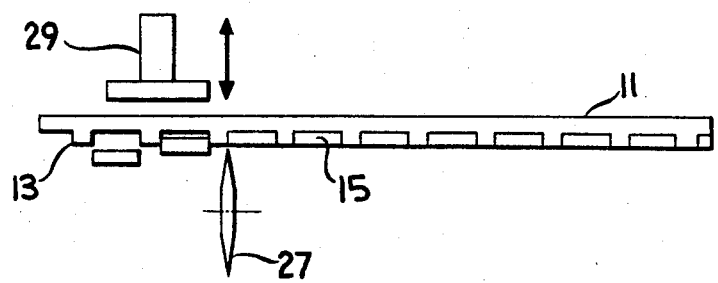
FIGURE 4 is a diagrammatic showing of the process steps wherein the envelope is opened, the structural assembly is removed from the envelope, and the spacer blocks are mechanically removed from the panel.

After the structural member assembly is formed, the envelope 17 is opened by a suitable means such as the cutter 27, and the structural member assembly is removed. The spacer blocks 15 are removed from the structural member assembly by mechanical means 29. If the pressures involved are so great that it is difficult to remove the blocks 15 by simple mechanical impact or vibration, cuts may be made in each of the blocks 15 as shown at the bottom of FIGURE 4 to facilitate mechanical removal.

Figure 2:
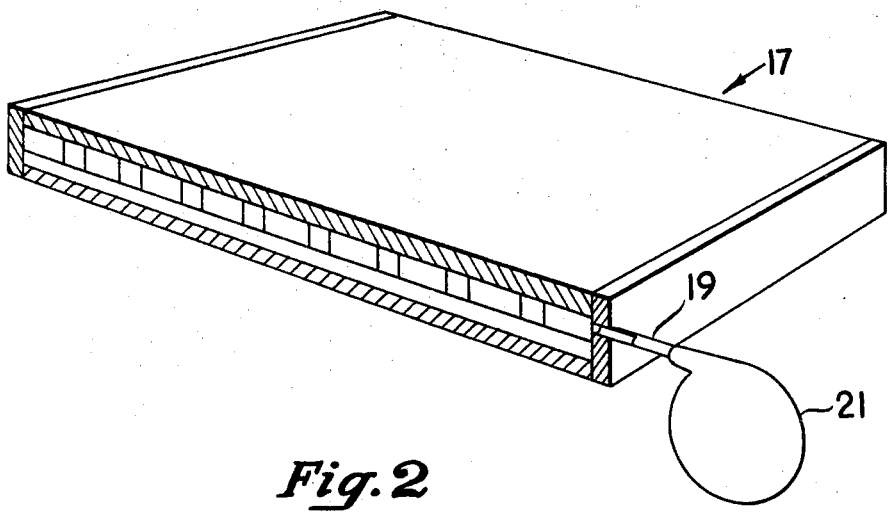
FIGURE 2 is a perspective view of the assembly shown in FIGURE 1 positioned inside an evacuated metal envelope, the front portion of the envelope being removed to disclose internal construction.
Figure 3:
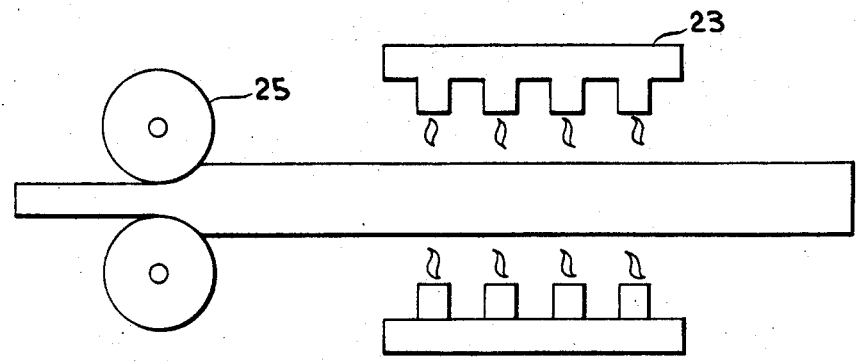
FIGURE 3 is a diagrammatic view of the process steps wherein the envelope and assembly of FIGURE 2 are heated and rolled.

FIGURE 5 discloses an assembly for producing the structural member shown in FIGURE 6. The plates 31, 33, 35, 37 and 39 are titanium or other high strength work material. It will be noted that it is desired to form a structural member which is tapered along one direction. Steel blocks 41, 43, 44 and 45 are shown adjacent the assembly of work material plates. It is to be understood that blocks similar to block 43 and block 45 are also positioned along the near side of the assembly toward the viewer. These two blocks have been omitted in the interest of drawing simplicity. This entire assembly then forms a tight rectangular package which can be placed in an envelope such as shown at 17 in FIGURE 2 and subjected to the process steps shown in FIGURES 2–4 of the drawings.

FIGURE 6 shows a completed structural member 47 after its removal from the envelope, and removal of the spacer blocks.

It may be desired to place a panel or web inside the longitudinal opening 49 in the structural member 47. This can be done by initially placing a titanium panel or web 51 inside the structural member assembly and then performing a second rolling operation along an axis 90° displaced from the first rolling axis. This joins the plates 33 and 37 to the panel 51 along their interfaces. The rolling mill is shown generally at 53 in FIGURE 7.

A waffle type construction is shown in FIGURE 8 of the drawings. A grid 55 of work material such as titanium or beryllium is formed first. This grid is usually fairly thin such as one-quarter inch or less, for example, and in such case the openings in this grid are provided by an inexpensive step such as punching or burning. The grid 55 is placed on a flat plate 57 of work material. Blocks 59 of filler material, such as steel or copper, are located as shown. A suitable parting agent is applied to such blocks. One of the grid cells 61 is shown open to reveal the nature of the construction. It is to be understood that this cell contains a block 69 during use of the process. This assembly is positioned inside an envelope with suitable spacer blocks to provide a rectangular open face package, and subjected to the process steps shown in FIGURES 2–4 of the drawings.

It will be noted that the process of the present invention readily lends itself to use in forming various open face configurations. The open face nature of the structural member permits ready low cost mechanical removal of the spacer blocks. The spacer blocks are easily recovered in an acceptable condition for salvage.

The process can be used with structural members which are several feet in size.

I claim:

1. The method of producing a structural member of high strength, high temperature material, comprising the steps of:
   arranging separate pieces of work material into a desired open face pattern;
   filling out said pattern into a desired shape with spacer blocks of a material different than the work material and formable at elevated temperatures, said spacer blocks being coated with a parting agent to prevent bonding of said blocks to said work material;
   placing the resulting assembly inside an envelope which can be reformed at elevated temperatures;
   creating a vacuum in said envelope and sealing said assembly inside said evacuated envelope;
   heating said envelope and the assembly contained therein to a temperature which will permit forming of said work material;
   applying roll pressure to said envelope and assembly to join said separate pieces of work material and form them into an integral open face structural member;
   removing said structural member assembly from said envelope;
   and mechanically removing said spacer blocks from the structural member.

2. The method of producing a structural member of high strength, high temperature material, comprising the steps of:
   arranging separate pieces of work material into a desired open face pattern, said separate pieces having interfaces in different directions;
   filling out said pattern into a desired shape with spacer blocks of a material different than the work material and formable at elevated temperatures, said spacer blocks being coated with a parting agent to prevent bonding of said blocks to said work material;
   placing the resulting assembly inside an envelope which can be reformed at elevated temperatures;
   creating a vacuum in said envelope and sealing said assembly inside said evacuated envelope;
   heating said envelope and the assembly contained therein to a temperature which will permit forming of said work material;
   rolling said envelope and assembly down under pressure in different directions to join said pieces of work material along all the interfaces and form said pieces into an integral open face structural member;
   removing said structural member assembly from said envelope;
   and mechanically removing said spacer blocks from the structural member.

3. The method of producing a reinforced structural panel of high strength, high temperature material, comprising the steps of:
   arranging separate bars of work material on a flat sheet of work material;
   placing spacer blocks of a material different than the work material and formable at elevated temperatures adjacent said bars of work material, said spacer blocks being coated with a parting agent to prevent bonding thereof to said work material;
   placing the resulting assembly inside a substantially rectangular envelope which can be reformed at elevated temperatures;
   creating a vacuum in said envelope and sealing said assembly inside said evacuated envelope;
   heating said envelope and the assembly contained therein to a temperature which will permit forming of said work material;
   rolling said envelope and assembly under pressure along an axis substantially parallel to said bars to join said bars and sheet and form them into an integral open face reinforced panel;
   removing said reinforced panel assembly from said envelope;
   and mechanically removing said spacer blocks from said reinforced panel.

4. The method of producing a waffle type structural member of high strength, high temperature material, comprising the steps of:
   arranging separate pieces of work material into a desired open face waffle pattern;
   filling out said pattern into a desired shape with spacer blocks of a material different than the work material and formable at elevated temperatures, said spacer blocks being coated with a parting agent to prevent bonding of said blocks to said work material;
   placing the resulting assembly inside an envelope which can be reformed at elevated temperatures;
   creating a vacuum in said envelope and sealing said assembly inside said evacuated envelope;
   heating said envelope and the assembly contained therein to a temperature which will permit forming of said work material;
   rolling said envelope and assembly under pressure to join said separate pieces of work material and form them into an integral open face waffle type structural member;
   removing said structural member assembly from said envelope;
   and mechanically removing said spacer blocks from the structural member.

References Cited

UNITED STATES PATENTS

| | | | |
|---|---|---|---|
| 2,851,770 | 9/1958 | Fromson | 29—470.9 X |
| 2,915,815 | 12/1959 | Bean et al. | 29—497.5 X |
| 3,044,160 | 7/1962 | Jaffee | 29—423 |
| 3,066,393 | 12/1962 | Malagari | 29—504 X |
| 3,070,880 | 1/1963 | Davis et al. | 29—497.5 X |
| 3,156,976 | 11/1964 | Whiting | 29—480 X |
| 3,262,196 | 7/1966 | Davis | 29—470.9 |
| 3,321,826 | 5/1967 | Lowy | 29—423 |

JOHN F. CAMPBELL, *Primary Examiner.*

J. CLINE, *Assistant Examiner.*